(12) United States Patent
Bianchi et al.

(10) Patent No.: US 8,111,385 B2
(45) Date of Patent: Feb. 7, 2012

(54) QUANTUM DOT-MEDIATED OPTICAL FIBER INFORMATION RETRIEVAL SYSTEMS AND METHODS OF USE

(75) Inventors: Maurice P. Bianchi, Palos Verdes Estates, CA (US); George A. Hamlin, Laguna Niguel, CA (US)

(73) Assignee: The Boeing Company, Chicago, IL (US)

( * ) Notice: Subject to any disclaimer, the term of this patent is extended or adjusted under 35 U.S.C. 154(b) by 520 days.

(21) Appl. No.: 12/359,593

(22) Filed: Jan. 26, 2009

(65) Prior Publication Data
US 2010/0188652 A1 Jul. 29, 2010

(51) Int. Cl.
*G01N 21/00* (2006.01)
(52) U.S. Cl. ..................................................... 356/73.1
(58) Field of Classification Search ........................ None
See application file for complete search history.

(56) References Cited

U.S. PATENT DOCUMENTS

| | | | |
|---|---|---|---|
| 5,015,863 A | 5/1991 | Takeshima et al. | |
| 5,229,320 A | 7/1993 | Ugajin | |
| 5,260,957 A | 11/1993 | Hakimi et al. | |
| 5,293,050 A | 3/1994 | Chapple-Sokol et al. | |
| 5,482,890 A | 1/1996 | Liu et al. | |
| 5,512,762 A | 4/1996 | Suzuki et al. | |
| 5,559,822 A | 9/1996 | Pankove et al. | |
| 5,684,309 A | 11/1997 | McIntosh et al. | |
| 5,888,885 A | 3/1999 | Xie | |
| 5,906,670 A | 5/1999 | Dobson et al. | |
| 6,768,754 B1 | 7/2004 | Fafard | |
| 7,020,372 B2 * | 3/2006 | Lee et al. | 385/129 |
| 7,103,079 B2 | 9/2006 | McInerney et al. | |
| 7,183,718 B2 | 2/2007 | Yoshida | |
| 7,192,999 B2 | 3/2007 | Mercado et al. | |
| 7,197,226 B2 * | 3/2007 | Chen et al. | 385/141 |
| 7,264,527 B2 | 9/2007 | Bawendi et al. | |

(Continued)

FOREIGN PATENT DOCUMENTS
WO 2007/136816 A2 11/2007

OTHER PUBLICATIONS

M. Kuntz et al.; 10Gbit/s data modulation suing 1.3 μm InGaAs quantum dot lasers; Electronic Letters; Mar. 3, 2005; vol. 41, No. 5; IEE.

(Continued)

*Primary Examiner* — Tu Nguyen
(74) *Attorney, Agent, or Firm* — Moore & Van Allen PLLC (57) ABSTRACT

The present disclosure relates to a non-invasive and real-time diagnostic analysis concept for an operational single mode optical fiber communication system and methods of using said system. The system comprises an optical fiber capable of being diagnosed non-invasively comprising an optical fiber for conveying a light beam that comprises an optical fiber comprising a first end for receiving the light beam and a second end opposed thereto, a core comprising an inner wall, and a cladding surrounding the core, the optical fiber further comprising at least one uncladded portion comprising a plurality of quantum dots dispersed in a medium, and wherein the quantum dots become activated by evanescent wave coupling resulting from total internal reflection of the light beam contacting the inner wall of the optical fiber core and wherein the activation results in emittance of light from the quantum dots.

30 Claims, 10 Drawing Sheets

U.S. PATENT DOCUMENTS

| | | | |
|---|---|---|---|
| 7,570,864 B2 * | 8/2009 | Chen et al. | 385/141 |
| 2002/0186921 A1 | 12/2002 | Schumacher et al. | |
| 2003/0174962 A1 | 9/2003 | Poole et al. | |
| 2006/0013532 A1 | 1/2006 | Wan | |
| 2008/0175292 A1 | 7/2008 | Sheik-Bahae | |

OTHER PUBLICATIONS

Donald Ulrich; Prospects for Sol-Gel Processes; Journal of Non-Crystalline Solids; 1990; pp. 465-479; 121; Elsevier Science Publishers B.V. (North-Holland).

R. Leon; Intermixing induced tunability in infrared emitting InGaAs/GaAs quantum dots; SPIE; Jul. 1999; vol. 3794; Part of the SPIE Conference Materials for High-Speed Detectors; Denver, CO, US.

Jun Zhang et al.; Wet-Chemical Synthesis of ZnTe Quantum Dots; Mater. Res. Soc. Symp. Proc.; vol. 942; 2006 Materials Research Society.

B.O. Dabbousi et al.; (CdSe)ZnS Core-Shell Quantum Dots: Synthesis and Characterization of a Size Series of Highly Luminescent Nanocrystallites; Journal of Physical Chemistry B; 1997; pp. 9463-9475; 101; American Chemical Society; Washington, DC, US.

J.P. Biersack et al.; Ion Beam Induced Changes of the Refractive Index of PMMA; Nuclear Instruments and Methods in Physics Research B46; 1990; pp. 309-312; Elsevier Science Publishers B.V. (North-Holland).

Weiyong Mao et al.; Synthesis of high-quality near-infrared-emitting CdTeS alloyed quantum dots via the hydrothermal method; Nanotechnology; 2007; 485611 (7pp); 18; IOP Publishing Ltd.; UK.

Takashi Jin et al.; Gd3+-functionalized near-infrared quantum dots for in vivo dual modal (fluorescence/magnetic resonance) imaging; Chem. Commun.; 2008; pp. 5764-5766; The Royal Society of Chemistry 2008.

A. Krier et al.; Mid-infrared electroluminescence from InAsSb quantum dot light emitting diodes grown by liquid phase epitaxy; Physica E 15; 2002; pp. 159-163; Elsevier Science B.V.

Jeffrey Franklin et al.; Refractive Index Matching: A General Method for Enhancing the Optical Clarity of a Hydrogel Matrix; Chemistry of Materials; 2002; pp. 4487-4489; 14; American Chemical Society.

Koji Otsubo et al.; Temperature-Insensitive Eye-Opening under 10-Gb/s Modulation of 1.3-μm P-Doped Quantum-Dot Lasers without Current Adjustments; Japanese Journal of Applied Physics; 2004; pp. L1124-L1126; vol. 43, No. 8B; The Japan Society of Applied Physics.

Xiaogang Peng et al.; Epitaxial Growth of Highly Luminescent CdSe/CdS Core/Shell Nanocrystals with Photostability and Electronic Accessibility; Journal of the American Chemical Society; 1997; pp. 7019-7029; 119; American Chemical Society.

Margaret A. Hines et al.; Synthesis and Characterization of Strongly Luminescing ZnS-Capped CdSe Nanocrystals; J. Phys. Chem.; 1996; pp. 468-471; 100; American Chemical Society.

Paul Calvert; Vegetable and mineral; Nature; Oct. 1991; pp. 501-502; vol. 353; Nature Publishing Group.

D. Wasserman et al.; Mid-Infrared Electroluminescence from InAs Self-Assembled Quantum Dots; Proc. of SPIE; 2006; vol. 6386, 6386E-1.

C.E. Finlayson et al.; Infrared Emitting PbSe Quantum Dots for Telecommunications-Window Applications; OSA/ASSP 2005.

Bruce M. Novak; Hybrid Nanocomposite Materials—Between Inorganic Glasses and Organic Polymers; Advanced Materials; 1993; pp. 422-433; 5, No. 6; VHC Verlagsgesellschaft mbH, D-69469 1993.

Wen Jiang et al.; Optimizing the Synthesis of Red-to Near-IR-Emitting CdS-Capped CdTexSe1-x Alloyed Quantum Dots for Biomedical Imaging; Chem. Mater.; 2006; pp. 4845-4854; 18; American Chemical Society.

European Patent Office, International Search Report and Written Opinion of the International Searching Authority, dated May 18, 2010.

Hecht, Jeff; "*The Laser Book*," $2^{nd}$ Ed., Tab Books, Blue Ridge Summit, PA, (1992); ISBN 0-07-027737-0; pp. 389-417 (Chapter 22).

Jiang et al., "Transparent Electro-Optic Ceramics and Devices," Optoelectronic Devices and Integration. Edited by Ming, Hai; Zhang, Xuping; Chen, Maggie Yihong. Proceedings of the SPIE, vol. 5644, pp. 380-394 (2005).

Klonkowski et al.; Emission enhancement of Eu(III) and/or Tb(III) ions entrapped in silica xerogels with ZnO nanoparticles by energy transfer; Journal of Non-Crystalline Solids; 352; 2006; pp. 4183-4189; Elsevier B.V.

Madler et al.; Rapid synthesis of stable ZnO quantum dots; Journal of Applied Science; vol. 92, No. 11; Dec. 1, 2002; pp. 6537-6540; American Institute of Physics.

Peng et al.; Formation of High-Quality CdTe, CdSe, and CdS Nanocrystals Using CdO as Precursor; J. Am. Chem. Soc.; 2001; vol. 123, No. 1; pp. 183-184; American Chemical Society.

Qu et al.; Alternative Routes toward High Quality CdSe Nanocrystals; Nano Letters; 2001; pp. 333-337; vol. 1, No. 6; American Chemical Society.

Schaller et al., Seven Excitons At a Cost of One: Redefining the Limits for Conversion Efficiency of Photons Into Charge Carriers Nano Lett. Mar. 2006;6(3):424-9.

Shabaev et al., Multiexciton Generation by a Single Photon in Nano crystals, Nano Lett. (2006) 6(12).

Shan et al.; The structure and character of CdSe nanocrystals capped ZnO layer for phase transfer from hexane to ethanol solution; Surface Science; 582; 2005; pp. 61-68; Elsevier B.V.

Song et al., Red light emitting solid state hybrid quantum dot—near-UV GaN LED devices Nanotechnology 2007 18 255202 (4pp).

Wu et al; Surface modification of ZnO nanocrystals; Applied Surface Science; 253; 2007; pp. 5473-5479; Elsevier B.V.

\* cited by examiner

QUANTUM DOT-MEDIATED OPTICAL FIBER INFORMATION RETRIEVAL SYSTEMS AND METHODS OF USE

FIELD OF THE DISCLOSURE

The present disclosure relates generally to optical fibers, and more particularly to non-invasive sensing mechanisms for the real-time diagnostic analysis of an operational optical fiber.

BACKGROUND

While optical fiber transmission systems have numerous advantages, they also have several problematic aspects. For example, (1) the transmitter power is subject to high manufacturing tolerance; (2) the transmitter power decreases with time (depending on wavelength, from scarcely detectable to very strong); (3) optical fibers made from plastic age very quickly, especially when exposed to strong temperature fluctuations; (4) the surface of the contact points of the optical fibers is scratched by frequent changing of the plugs, which additionally increases the attenuation; and (5) the sensitivity of the receivers is likewise subject to high manufacturing tolerance. One of the worst problems is posed by aging and the decreasing transmitter power. The failure of an optical fiber link, for example owing to high attenuation of the optical fiber, can cripple entire systems.

Several different methods have been established to monitor the health of an optical fiber transmission system to detect such problems. However, current methods are extremely complicated, invasive, and often involve the disruption of the communication operation. For example, one method involves mechanically forcing and critically aligning a bare (uncladded) portion of an optical fiber against an unclad portion of the operational fiber in order to extract the information by evanescent wave coupling (i.e., the process by which electromagnetic waves are transmitted from one medium to another by means of the evanescent, exponentially decaying electromagnetic field). Another method involves bending the operational fiber enough to cause the transmitted information carrying light wave to fall into the escape cone of the fiber so that it can be retrieved by a diagnostic sensor.

As such, it would be advantageous to have a non-invasive fiber-optic sensor for performing real-time diagnostics on signal and information transmission with a minimum of disruption and complexity.

SUMMARY

The present disclosure relates to an optical sensor device, and methods of using the device, for the real-time diagnosis of an operational single mode optical fiber communication system in a simple, non-invasive manner. The devices and methods of the present disclosure also do not require any force-fitting or critical alignment of another optical fiber, or bending of the optical fiber, to contact the operational fiber in order to couple the evanescent wave.

One aspect of the present disclosure provides an optical fiber capable of being diagnosed non-invasively comprising an optical fiber for conveying a light beam; the optical fiber comprising a first end for receiving said light beam and a second end opposed thereto, a core comprising an inner wall, and a cladding surrounding the core, the optical fiber further comprising at least one uncladded portion comprising a plurality of quantum dots dispersed in a medium, wherein the quantum dots become activated by evanescent wave coupling resulting from the total internal reflection of the light beam contacting the inner wall of the optical fiber core and wherein the activation results in emittance of light from the quantum dots.

In one embodiment, the plurality of quantum dots comprise a bandgap that is below the bandgap of the light beam. In yet another embodiment, the quantum dots are tuned to emit infrared light.

Another aspect of the disclosure provides a system for the non-invasive and real-time diagnosis of an optical fiber comprising an optical fiber for conveying a light beam, the optical fiber comprising a first end for receiving the light beam and a second end opposed thereto, a core comprising an inner wall, and a cladding surrounding the core, the optical fiber further having at least one uncladded portion, wherein the uncladded portion comprises a plurality of quantum dots dispersed in a medium; a light source to inject a light beam into the first end of the optical fiber; a detecting device for detecting light emitted from the plurality of quantum dots; and an analyzing apparatus for analyzing the detected light operably connected to the detector.

Yet another aspect of the present disclosure provides a method of non-invasively diagnosing an optical fiber comprising placing a medium comprising a plurality of quantum dots dispersed therein on an uncladded portion of the optical fiber; injecting a light beam into one end of the optical fiber; and detecting any light emitted from the quantum dot that has become activated by evanescent wave coupling resulting from the internal reflection of the light beam contacting an inner wall of the optical fiber core.

Various other aspects, features and embodiments will be more fully apparent from the ensuing discussion and appended claims. The features, functions, and advantages that have been discussed can be achieved independently in various embodiments of the present disclosure or may be combined in yet other embodiments further details of which can be seen with reference to the following description and drawings.

DESCRIPTION

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, preferred methods and materials are described herein.

The articles "a" and "an" are used herein to refer to one or to more than one (i.e. at least one) of the grammatical object of the article. By way of example, "an element" means at least one element and can include more than one element.

As used herein, the terms "light" and "photon" are used interchangeably, and are defined as a discreet bundle of electromagnetic energy and is intended to include gamma rays, x-rays, ultraviolet rays, visible light, infrared light, microwaves and radiowaves.

As used herein, the term "dispersed" is defined as the distributing or spreading of a fine particle (e.g., a plurality of quantum dots) more or less evenly throughout a medium.

The term "optical communication" as used herein is defined as the ability of an object to come into contact with light reflected by, or emitted from, a different object. For example, a light detector of the present disclosure is in optical communication with a quantum dot of the present disclosure when light emitted from the quantum dot is able to come into contact with the detector.

The term "operably connected" as used herein is defined as the connecting of two devices or objects such that each is able to communicate (e.g., transmit data between devices) and/or function as a result of the connection.

The terms "light beam" and "carrier light wave" are used interchangeably herein and refer to the light that travels within the fiber optic core.

The term "activation" as used herein refers to the movement of an electron from the valance band to the conduction band of a quantum dot as a result of an external stimuli (e.g., heat, evanescent wave coupling, voltage, photon flux and the like). The raised electron and created hole taken as a pair are referred to as an exciton. The raised electron only remains in the conductive band for a short period of time before returning to the valance band. As the electron falls back down across the bandgap, electromagnetic radiation with a wavelength corresponding to the energy it loses in the transition is emitted. As used herein, the term "emitted light" refers to the emitted electromagnetic radiation released by the raised electron when falling back across the bandgap.

The terms "fiber optic cable," "optical fiber," "optical communication fiber" and "optical cable" are used interchangeably herein and refer to those fibers that carry light along its length. Typically, the longest wavelength used for optical fiber communication is about 1550 nm.

Figure 1:
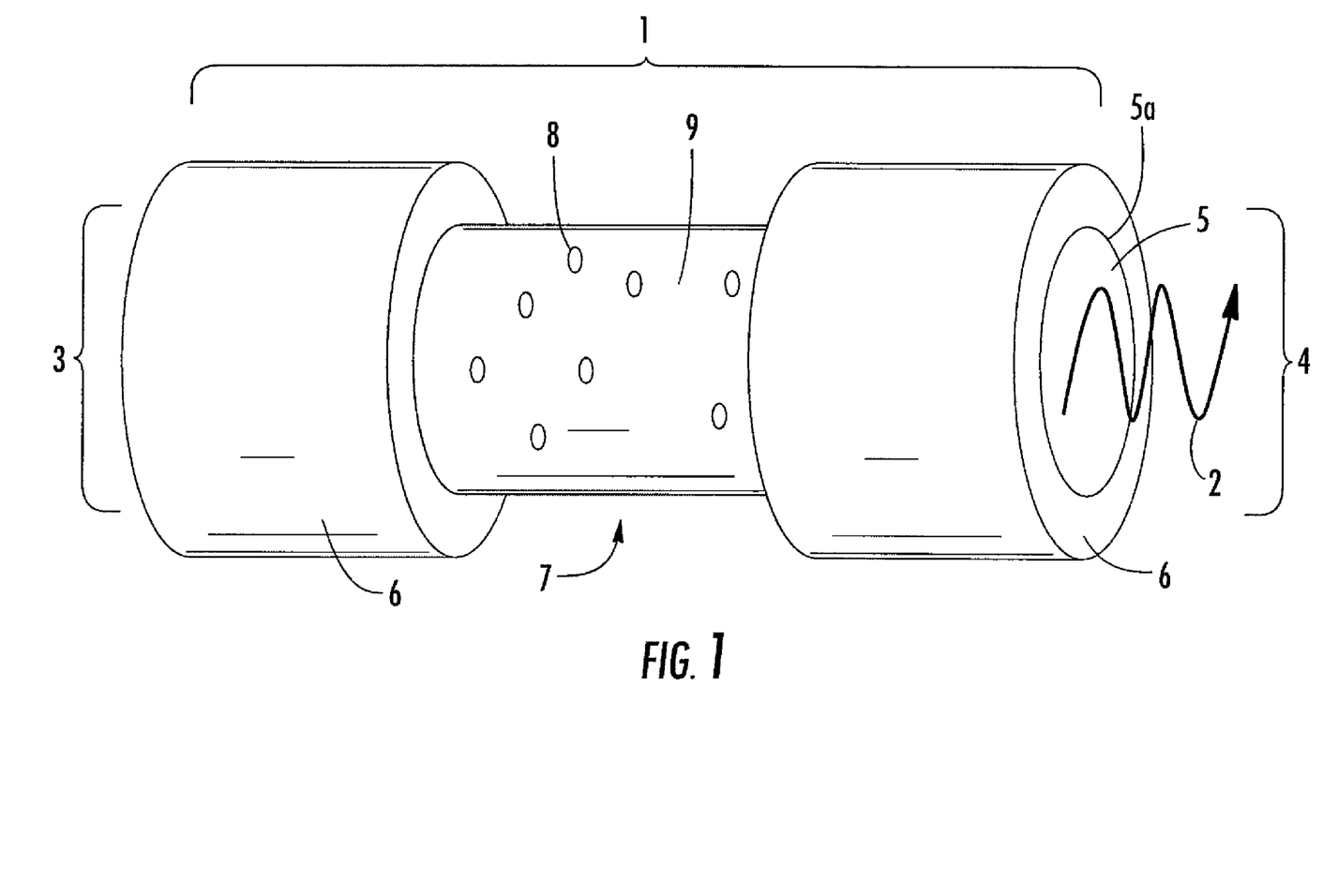
FIG. 1 is an illustration of one embodiment of a fiber optic communication fiber according to the present disclosure.

The present disclosure relates to the real-time diagnostic analysis of an operational single mode optical fiber communication system in a simple and non-invasive manner. Referring to FIG. 1, there is shown an optical fiber 1 for carrying a light beam 2. The optical fiber 1 comprises a first end 3 for receiving a light beam and a second end 4 opposed thereto, a core 5 comprising an inner wall 5a, and a cladding 6 surrounding the core 5. The optical fiber 1 also comprises at least one uncladded portion 7. Within the uncladded portion 7 is a plurality of quantum dots 8 dispersed in a medium 9 and positioned such that the plurality of quantum dots 8 are in optical communication with the light traveling through the optical fiber 1.

Figures 2A, 2B, 2C:
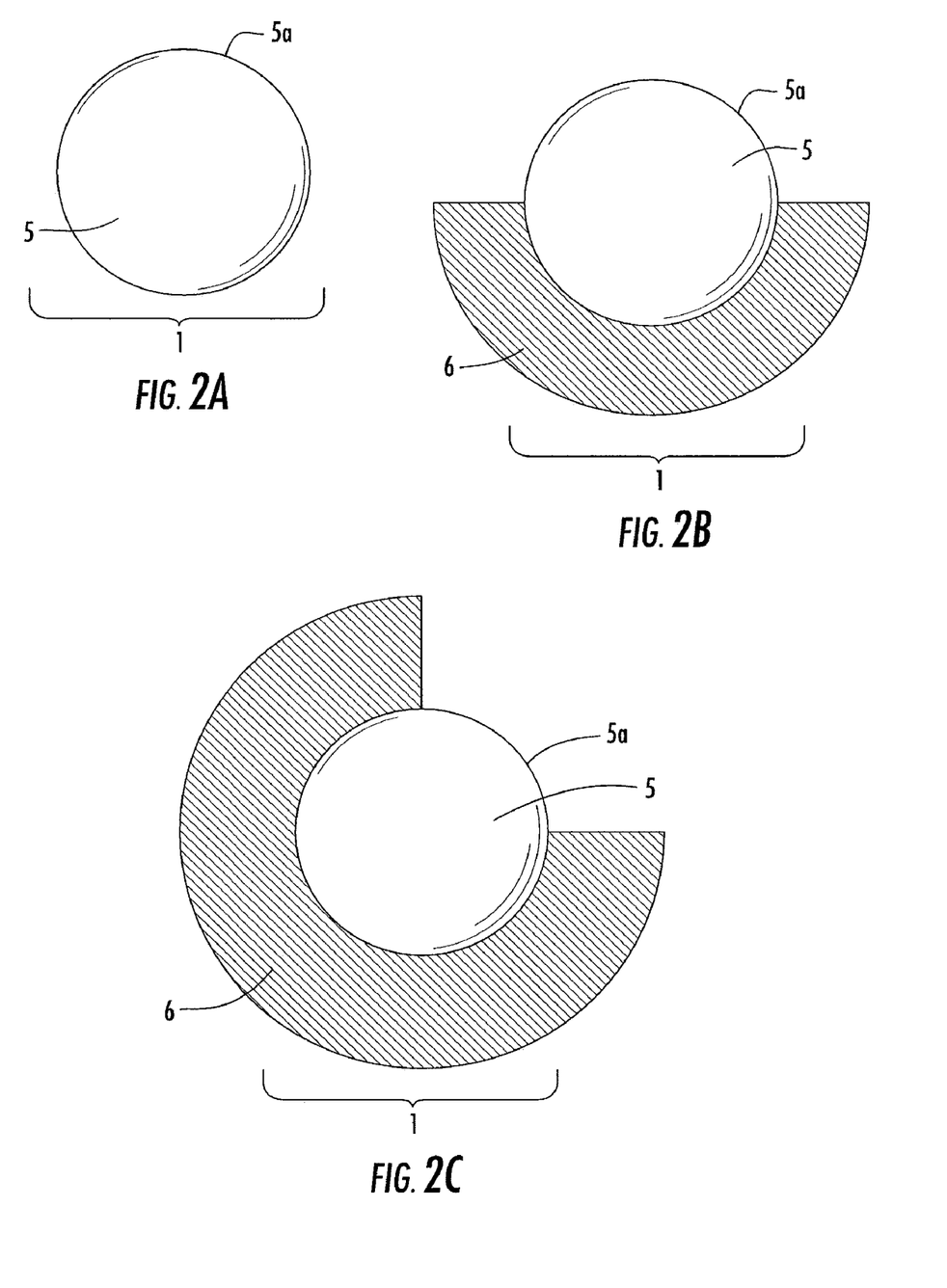
FIG. 2A, FIG. 2B and FIG. 2C are illustrations of cross-sectional side views of the optical fiber according to some of the embodiments of the present disclosure.

The uncladded portion 7 may be obtained by removing a portion of the cladding 6. The removal of the cladding 6 may be done using many techniques known to those skilled in the art, such as plasma processing, chemical etching, and laser processing. For example, chemical etching may be done using chemicals such as hydrofluoric acid (HF) that dissolves the optical fiber components in a rather linear way by removing progressively the exposed cladding material. Alternatively, it may be advantageous to use laser processing, which provides greater flexibility and improved integrity of the mechanical and physical properties of the optical fiber as compared to chemical etching. It is not imperative that all of the cladding be removed from a portion of the optical fiber. Indeed, it may be advantageous to remove the cladding from only a portion of the optical fiber, thereby reducing the risk of compromising mechanical integrity of the fiber, since less material need to be removed to reach the core. Such embodiments are illustrated in FIG. 2. For example, in certain embodiments, and as shown in FIG. 2A, the cladding may be removed entirely from around the fiber optic core thus completely exposing the fiber optic core 5 and inner fiber optic core wall 5a. In other embodiments, and as shown in FIG. 2B, the cladding 6 may be removed from only one half of the fiber optic cable thereby exposing only one half of the core 5 and inner core wall 5a. In yet another embodiment, and as shown in FIG. 2C, the cladding 6 may be removed from only one quarter of the fiber optic cable thus exposing only one quarter of the core 5 and inner core wall 5a. These figures are illustrative only, and it is within the scope of the disclosure to include removal of the cladding from 0.1° to 360° around the cable core. The amount of cladding to be removed will depend on numerous factors, such as amount of core contact needed, strength/integrity of the fiber optic cable, etc. and can be readily determined by one skilled in the art.

Again referring to FIG. 1, the uncladded portion 7 of the optic fiber 1 comprises a plurality of quantum dots 8 dispersed in a medium 9.

Figure 3:
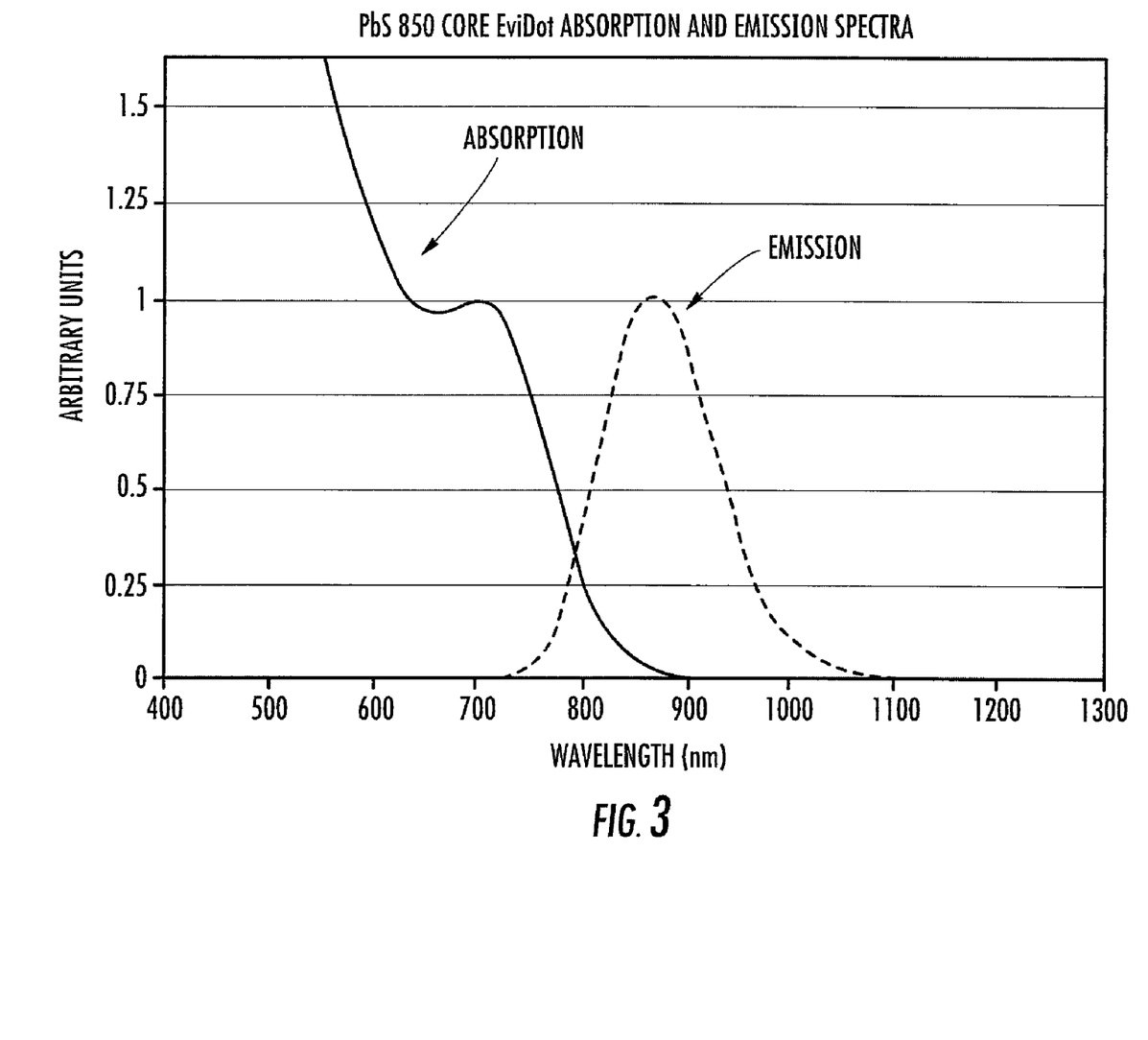
FIG. 3 is a graph showing the adsorption and emission spectra for PbS.

As will be appreciated by the ordinary skilled artisan, the term "quantum dot" ("QD") in the present disclosure is used to denote a semiconductor nanocrystal. QDs are semiconductor materials whose size corresponds to the Bohr radius of the exciton (i.e., the bound state of an electron and electron hole). Instead of exhibiting characteristics of the bulk material, QDs instead exhibit characteristics of those atoms found in the bulk material of the same composition. Characteristically, and as shown generally in FIG. 3 for PbS, QDs show broad absorption above their bandgap (i.e., the energy difference between a material's non-conductive and conductive states) and a very narrow emission separated to a large extent from their absorption in contrast to the bulk material. Furthermore, the response time, i.e., photon absorption and photon emission times, are in the picosecond range, therefore easily following the information modulation rate of the optical fiber transmission. See, e.g., Otsubo, K. *Japanese Journal of Applied Physics, Part 2—Letters and Express Letters*. (2004) 43, L1124; and Kuntz, M. *Electronic Letters*. (2005) 41, 244.

According to the present disclosure, the QD comprises a "core" that is a nanoparticle-sized semiconductor. Semiconductors are chemical compounds of elements from the periodic table, and are grouped according those elements which make up the semiconductor. For example, group II-VI semiconductors comprise elements from groups II and/or VI of the periodic table (e.g., ZnS, ZnSe, ZnTe, CdS, CdSe, CdTe, HgS, HgSe, HgTe, alloys thereof and mixtures thereof, group III-V semiconductors comprise elements from groups III and/or V of the periodic table (e.g., GaAs, GaP, GaSb, InGaAs, InAs, InP, InSb, AlAs, AlP, AlSb, alloys thereof and mixtures thereof), group IV semiconductors comprise elements from group IV of the periodic table (e.g., Ge, Si), and group IV-VI semiconductors comprise elements from group IV and/or VI of the periodic table (e.g., PbS, PbSe, PbTe).

The QD may also comprise a core and a cap comprised of different materials (i.e. fluorescence of the QD can be increased and enhanced by using a core/cap structure). Hence, in those embodiments where fluorescence of the QD is desired, a core/cap structure may be used. As used herein, the term "cap" refers to a semiconductor that differs from the semiconductor of the core and binds to the core, thereby forming a surface layer or shell on the core. The cap must be such that, upon combination with a given semiconductor core, results in a luminescent quantum dot. In this regard, the cap helps stabilize and enhance the fluorescence emitted by the excited core (e.g., when the core is contacted with ultraviolet light). Preferably, the cap passivates the core by having a higher band gap than the core, so the excitation of the QD is confined to the core, thereby eliminating nonradiative pathways and preventing photochemical degradation. Typical examples of QD cores include, but are not limited to, ZnO, ZnS, ZnSe, ZnTe, CdO, CdS, CdSe, CdTe, MgS, MgSe, GaSa, GaN, GaP, GaSb, HgO, HgS, HgSe, HgTe, InAs, InN, InP, InSb, AlAs, AlN, AlP, AlSb, alloys thereof, and combinations thereof. Some examples of core:cap combination which are within the scope of the present disclosure include, but are not limited to, CdS/HgS/CdS, InAs/GaAs, GaAs/AlGaAs, and CdSe/ZnS. In general, the cap is 1-10 monolayers thick, more preferably 1-5 monolayers, and most preferably 1-3 monolayers. A fraction of a monolayer is also encompassed under the present disclosure. Regardless of whether a single core or a core/cap structure is used, the entire QD preferably has a diameter ranging from 0.5 nm to 50 nm, more preferably from 1 nm to 30 nm, more preferably from 1 nm to 20 nm, and more preferably from 1 nm to 10 nm.

QDs may be synthesized in numerous ways and are well known to those skilled in the art. Some common methods include (1) the spontaneous generation in quantum well structures due to monolayer fluctuations in the well's thickness; (2) the capability of self-assembled QDs to nucleate spontaneously under certain conditions during molecule beam epitaxy (MBE) and metallorganic vapor phase epitaxy (MOVPE), when the material is grown in a substrate to which it is not lattice matched; (3) the ability of individual QDs to be created from two-dimensional electron or hole gases present in remotely doped quantum wells or semiconductor heterostructures; and (4) chemical methods, such as synthesizing ZnTe QDs in high-temperature organic solution (see, e.g., Zhang, J. et al. Materials Research Society Symposium Proceedings, Vol. 942, 2006). These and other processes for the synthesis of QDs are well known in the art as disclosed, for example, by U.S. Pat. Nos. 5,906,670, 5,888,885, 5,229,320, 5,482,890, and Hines, M. A. *J. Phys. Chem.*, 100, 468-471 (1996), Dabbousi, B. O. *J. Phys. Chem.* B, 101, 9463-9475 (1997), Peng, X., *J. Am. Chem. Soc.*, 119, 7019-7029 (1997), which are incorporated herein by way of reference.

The wavelength emitted by the QDs is selected according to the physical properties of the QDs, such as the size of the nanocrystal. QDs are known to emit light from about 300 nm to about 1700 nm. For example, CdSe QDs can be produced that emit colors visible to the human eye, so that in combination with a source of higher energy than the highest energy of the desired color, these QDs can be tailored to produce visible light of a spectral distribution. QDs can also be produced to emit light in the ultraviolet and infra red spectral ranges.

Figure 4:
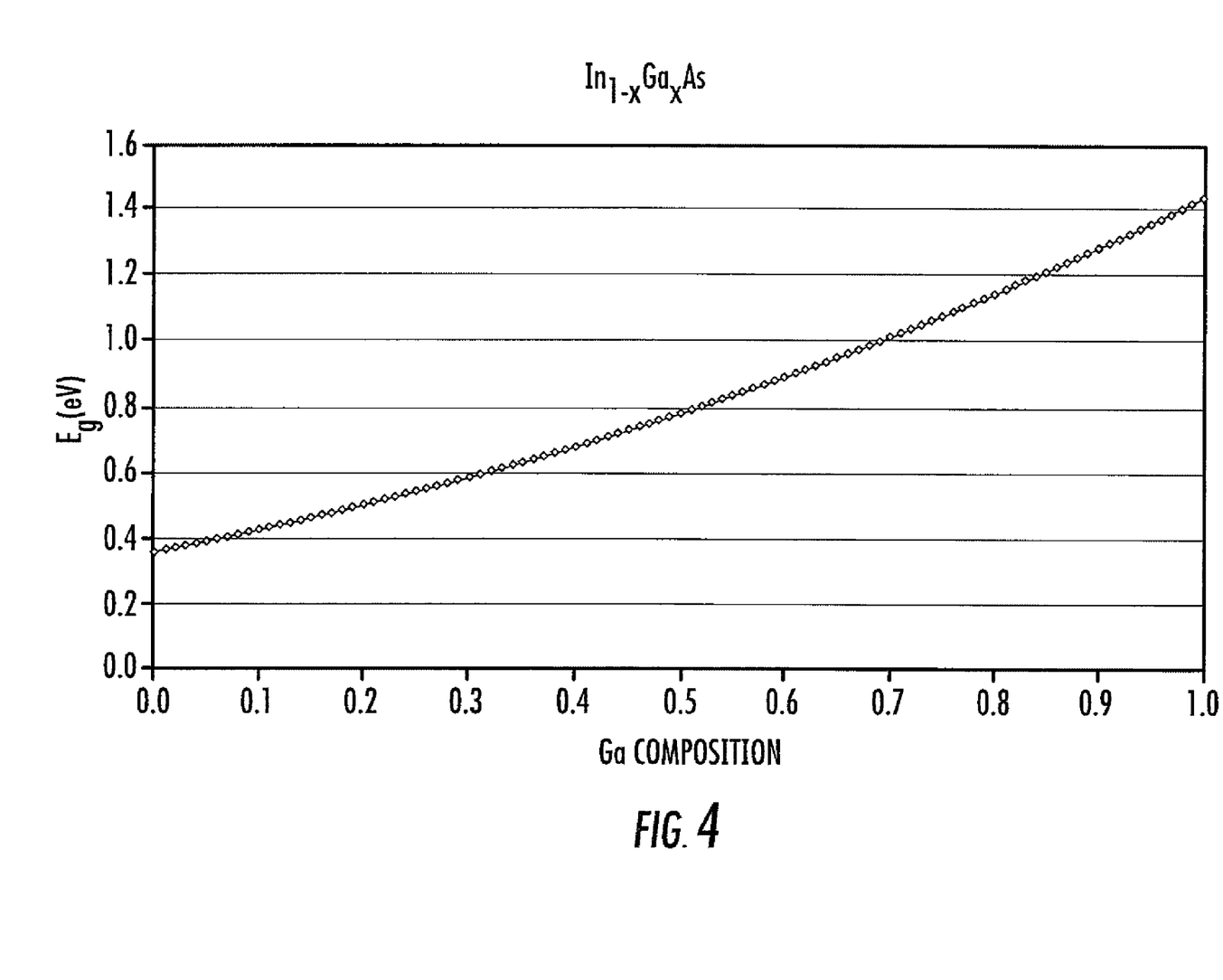
FIG. 4 is a graph showing the bandgap for a quantum dot comprising InGaAs as the composition of Ga changes.

QDs may be "tuned" by varying the composition and the size of the QD and/or adding one or more caps around the core in the form of concentric shells to widen the band gap width of the QD. As the QD approaches the excitation Bohr radius of the semiconductor of the QD, the bandgap will get wider. Therefore, the smaller the QD, the wider the band gap. For example, Indium Arsenide has a bandgap of 0.36 eV. Light emitted from this QD has an infrared wavelength of 2.78 µm. However, by making a ternary alloy of Indium Arsenide having a composition of 0.53 Indium and 0.47 gallium, the wavelength of the emitted light can be changed to 1.68 µm. This concept is depicted in FIG. 4, which shows the bandgap variation in InGaAs ternary alloys as the gallium content is varied. Therefore, changing the band gap, and thus the color of light a QD absorbs or emits, requires only adding or subtracting atoms from the QD.

In accordance with the present disclosure, the QDs are tuned to absorb the longest wavelength used for optical fiber communications, which is typically about 1550 nm. The QDs must then be able to absorb enough energy at that wavelength with little or nor overlap between the absorption and emissions spectral curves, which will be longer than 1550 nm (see, e.g., FIG. 4). Therefore, in accordance with the present disclosure, the bandgap of the QDs is preferably below that of the bandgap of the carrier light wave. Furthermore, the wavelength emitted by the QDs of the present disclosure upon excitation by evanescent wave coupling generated by the total internal reflection of the light beam inside the fiber optic cable is preferably in the infra red (IR) wavelength regime. Several types of infrared-emitting QDs are known to those skilled in the art and are within the scope of the present disclosure. Such examples include, but are not limited to, InAs, InGaAs, PbS, CdTe, MgTe, PbSe, CdTeS, InSb, InAsSb, GaSb, CdS-capped CdTexSel, $Gd^{3+}$, and combinations thereof. Finlayson, C. et al. *Adv. Solid-State Photonics, Technical Digest (Optical Society of America,* 2005), paper W1322; Mao, W. et al., *Nanotechnology.* 2007 18(48): 485611.1-485611.7; Leon, R. et al., *Proc. SPIE* 1999. 3794:8-14; Jin, T. et al., *Chem Commun.* 2008, 5764-5766; Krier, A. et al., *Physica E-Low-Dimensional Systems & Nanostructures.* 2006.15(3): 159-163; Jiang, W. et al., *Chemistry of Materials.* 2006. 18:4845; and Wasserman, D. et al. *Proc. SPIE.* 2006. 6386: 63860E, all of which are hereby incorporated by reference.

As used herein, the term "infra red light" refers to the wavelength of light which is longer than visible light but shorter than terahertz radiation and microwaves. Infra red light has a wavelength of between 750 nm and 1 mm. According to the International Commission on Illumination, infra red light encompasses three "subdivisions" based on wavelength. These include: (1) Infra Red-A (IR-A) that has a wavelength range of about 700 nm to 1400 nm; (2) Infra Red-B (IR-B) that has a wavelength range of about 1400 nm to 3000 nm; and (3) Infra Red-C (IR-C) that has a wavelength range of about 3000 nm to 1 mm. Those skilled in the art will also recognize that Infra Red light may also be subclassified according to the following scheme: (1) Near-infra red (NIR) that has a wavelength of about 0.75 to 1.4 µm; Short-wavelength infra red (SWIR) that has a wavelength of about 1.4 µm to 3 µm; (3) Mid-wavelength infra red (MWIR) that has a wavelength of about 3 µm to 8 µm; (4) Long-wavelength infra red (LWIR) that has a wavelength of about 8 µm to 15 µm; and (5) Far infra red (FIR) that has a wavelength of about 15 µm to 1,000 µm. All of these are within the scope of the present disclosure. In certain embodiments, the plurality of QDs emit light in the infrared regime and have a wavelength of about 0.1 μm to 1000 μm, from about 0.7 μm to 750 μm, from about 1.0 μm to about 500 μm, and from about 1.5 μm to about 250 μm.

According to the present disclosure, the plurality of QDs 8 are dispersed within a medium 9. The term "medium" 9 as used herein refers to any material in which the QDs 8 can be dispersed and that is at least partially transparent or translucent, i.e., allows light to pass through or diffuses light passing through.

Figure 5A:
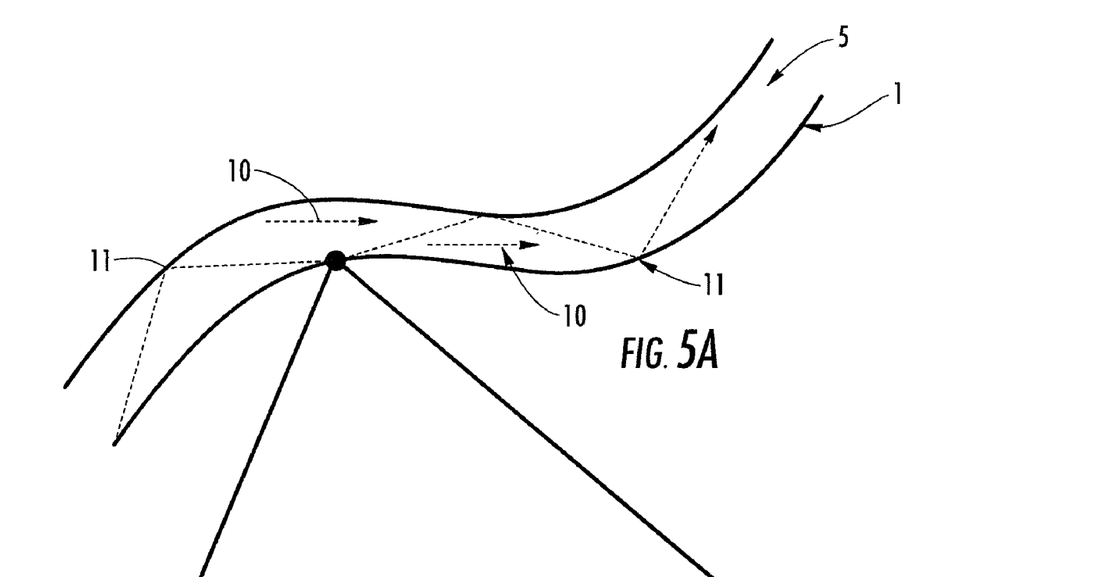
FIG. 5A is an illustration depicting how light travels through a fiber optic cable in accordance with the present disclosure.
Figure 5B:
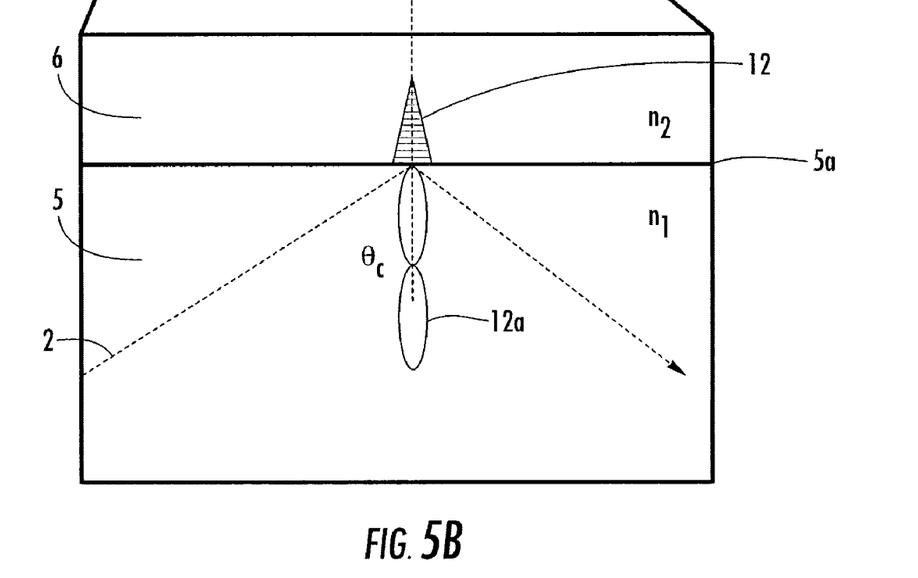
FIG. 5B is a detailed view of light contacting the inner wall of the fiber optic core, highlighting the concept of total internal reflection and evanescent wave generation.

Fiber optics use the property of total internal reflection to keep light beams focused without significant loss of signal. Total internal reflection is an effect that combines both reflection and refraction. This concept is depicted in FIG. 5A. Specifically, light traveling through an optical fiber 1 has an angular content comprised between rays travelling parallel along the fiber 10 and rays undergoing total internal reflection 11 on the inner walls of the fiber core 5a at a determined angle known as the critical total internal reflection angle ($\theta_c$). FIG. 5B shows a close up of where the light hits the interior wall of the fiber optic core wall 5a as shown in FIG. 5A. This critical angle is determined by the following formula (equation 1):

$$\theta_c = \sin^{-1}(n_2/n_1) \quad \text{equation 1}$$

where $n_1$ and $n_2$ are the refractive indices of the fiber core 5 and cladding 6, respectively. This angle is measured between the ray of light and the normal to fiber core walls. Rays having an angle equal to or above this value ($\theta_c$) will be reflected on the fiber core wall and the ones having an angle lower than this value will partly go through the wall.

At the point of total internal reflection, and as shown in FIG. 5B, evanescent waves 12 are formed when the sinusoidal waves are internally reflected off of the interior wall of the fiber optic core 5a at an angle greater than the critical angle such that internal reflection occurs. The intensity of these evanescent waves decay exponentially with distance from the interface at which they are formed. Also formed at the point of internal reflection are standing waves 12a that are reflected back into the fiber optic core 5.

As previously discussed and according to Equation 1, in order to obtain optimal results, the coupling of the light from the optical fiber core to the medium containing the QDs is optimized through the proper choice of the refractive index of the medium with respect to that of the fiber core. This is achieved by making the refractive index of the medium lower than the refractive index of the fiber core. Table 1 below provides a number of materials suitable for use as a medium in the present disclosure as well as their respective indexes.

TABLE 1

| Material | Refractive Index (approximate) |
| --- | --- |
| Glass, Arsenic Trisulfide | 2.04 |
| Glass, Crown (common) | 1.52 |
| Glass, Flint (29% lead) | 1.569 |
| Glass, Flint (55% lead) | 1.669 |
| Glass, Flint (71% lead) | 1.805 |
| Glass, Fused Silica | 1.459 |
| Glass, Pyrex | 1.474 |
| Lucite | 1.495 |
| Plastic | 1.46-1.55 |
| Salt | 1.516 |
| Polystyrene | 1.55-1.59 |
| Polyimide | 1.70 |
| Polyacrylamide | 1.48 |
| Polymethylmethacrylate (PMMA) | 1.48 |
| Polyethylene | 1.51 |
| Poly-diacetylene | 1.50 |

TABLE 1-continued

| Material | Refractive Index (approximate) |
| --- | --- |
| Polysaccharide | 1.10-1.80 |
| Polysulfone | 1.63 |
| Polypyrrole | 1.334 |
| Polythiophene | 1.95-2.28 |
| Polyether | 1.42-1.45 |
| Epoxy | 1.49-1.53 |
| Silica glass | 1.459 |
| Silica gel | 1.47 |
| Siloxane | 1.44 |
| Polyphosphate | 1.48 |
| Hydrogel | 1.48-1.55 |
| Agarose | 1.33-1.51 |
| Cellulose | 1.46 |
| Sol Gel | 1.40-1.60 |
| Polycarbonate | 1.55 |
| Polypropylene | 1.51 |

It should be noted that the index of refraction of a medium can be changed by altering its composition and/or properties, and are well known to those skilled in the art. For example, the index of refraction for PMMA can be altered by exposing the PMMA to an ion beam, see, e.g., Biersack, J. et al., *Nuclear Instruments and Methods in Physics Research*. 1990. Section B, 46(1-4): 309-312. Similarly, the addition of inorganic compounds may also alter the index of refraction for a medium. See, e.g., U.S. Pat. No. 7,192,999. For polyacrylamide, the index of refraction can be altered by adding/removing sucrose. See, e.g., Franklin, J. et al. Chem. Mater. 2002. 14:4487-4489. In certain embodiments, the medium material may include, but is not limited to, Sol-Gel glass, polyacrylate, polystyrene, polyimide, polyacrylamide, polymethylmethacrylate, polyethylene, polyvinyl, poly-diacetylene, polyphenylene-vinylene, polypeptide, polysaccharide, polysulfone, polypyrrole, polyimidazole, polythiophene, polyether, epoxies, silica glass, silica gel, fluorozirconate glass, fluoroaluminate glass, chalcogenide glass, siloxane, polyphosphate, hydrogel, agarose, cellulose and the like. In certain embodiments, the medium is Sol Gel glass or polymethylmethacrylate. Sol-gel chemistry, and exemplary monomers used to prepare inorganic matrices by sol-gel chemistry, are disclosed in the following references, where each of the following references is hereby incorporated herein by reference: see, e.g., C. J. Brinker et al. *Sol-Gel Science, The Physics and Chemistry of Sol-Gel Processing*, Academic Press, San Diego (1990); D. R. Ulrich J. *Non-Cryst. Solids* (1990) 121:419; G. L. Wilkes et al., *Silicon-Based Polymer Science, Advances in Chemistry Series* 224; J. M. Ziegler and F. W. Fearon, Eds. *Am. Chem. Soc.*, Wash., D.C. (1990), pp. 207-226; R. Dagani, *Chemical & Engineering News* (1991) 69-21:30; P. Calvert, *Nature* (1991) 353:501; and B. M. Novak, *Adv. Mater.* (1993) 5:422.

The insertion of the QDs dispersed in the medium may be placed within the uncladded portion of the optical fiber in many ways that are well known to those skilled in the art. For example, in the case where the QDs are in a powder, they can be placed within the opening by integrating the QDs with an epoxy glue, preferably having a refractive index less than that of the fiber core. The medium may also be integrated into a silica powder which can be melted into the opening by heating with a heating devices, such as a laser. In the case where the medium can be melted with a laser without damaging the quantum dots, the medium could me directly melted into the uncladded portion. Alternatively, the medium can be included into a paste, which can be cured by UV or laser illumination. In the case where the medium can not be down sized into a powder or paste, it can be chemically etched or laser machined to match the shape of the uncladded portion. The medium may then "glued" into place with, for example, an epoxy.

Figure 6:
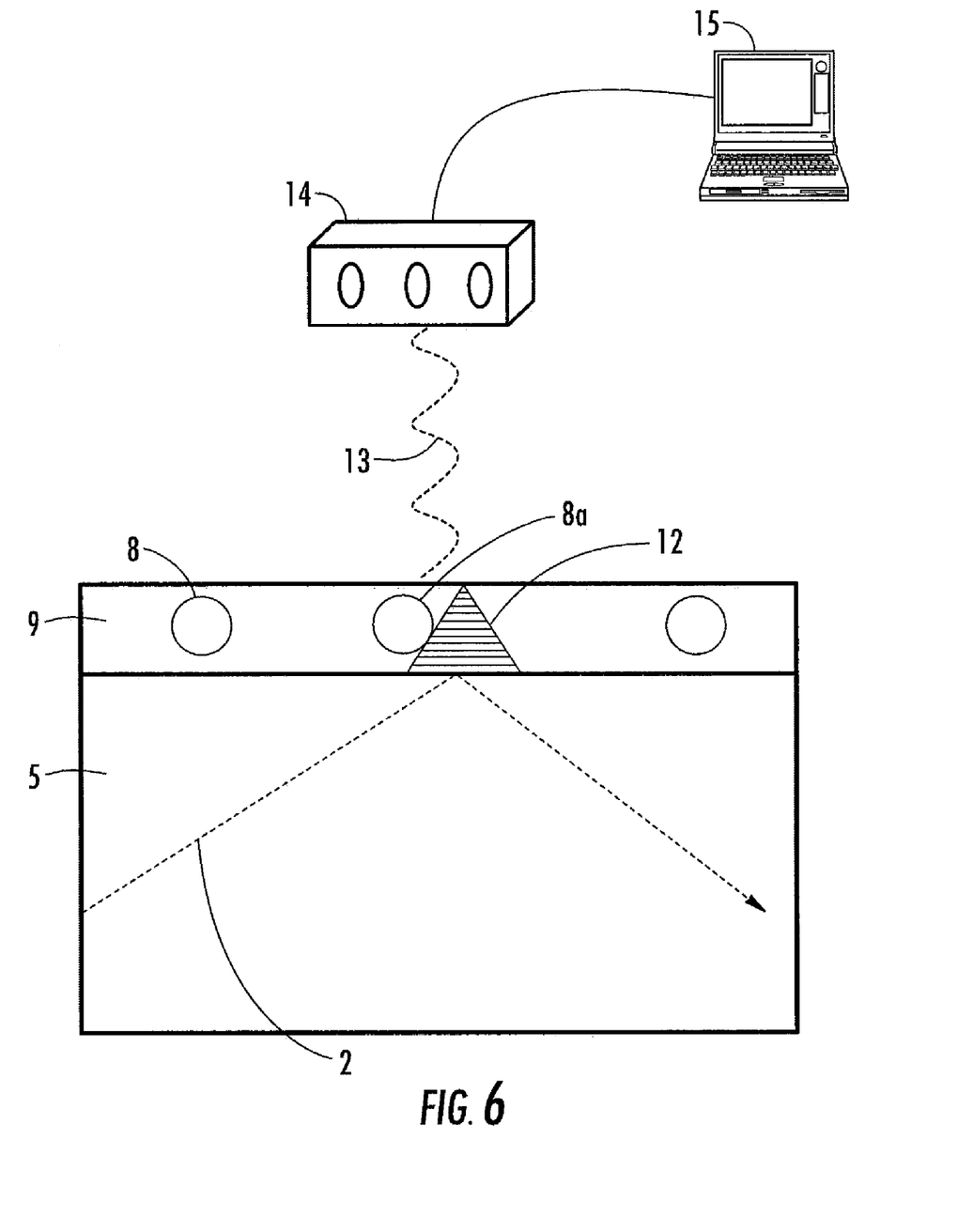
FIG. 6 is a detailed view illustrating how quantum dots are excited by evanescent wave coupling generated by the total internal reflection of light traveling within the fiber optic core in accordance with the present disclosure.
Figure 7:
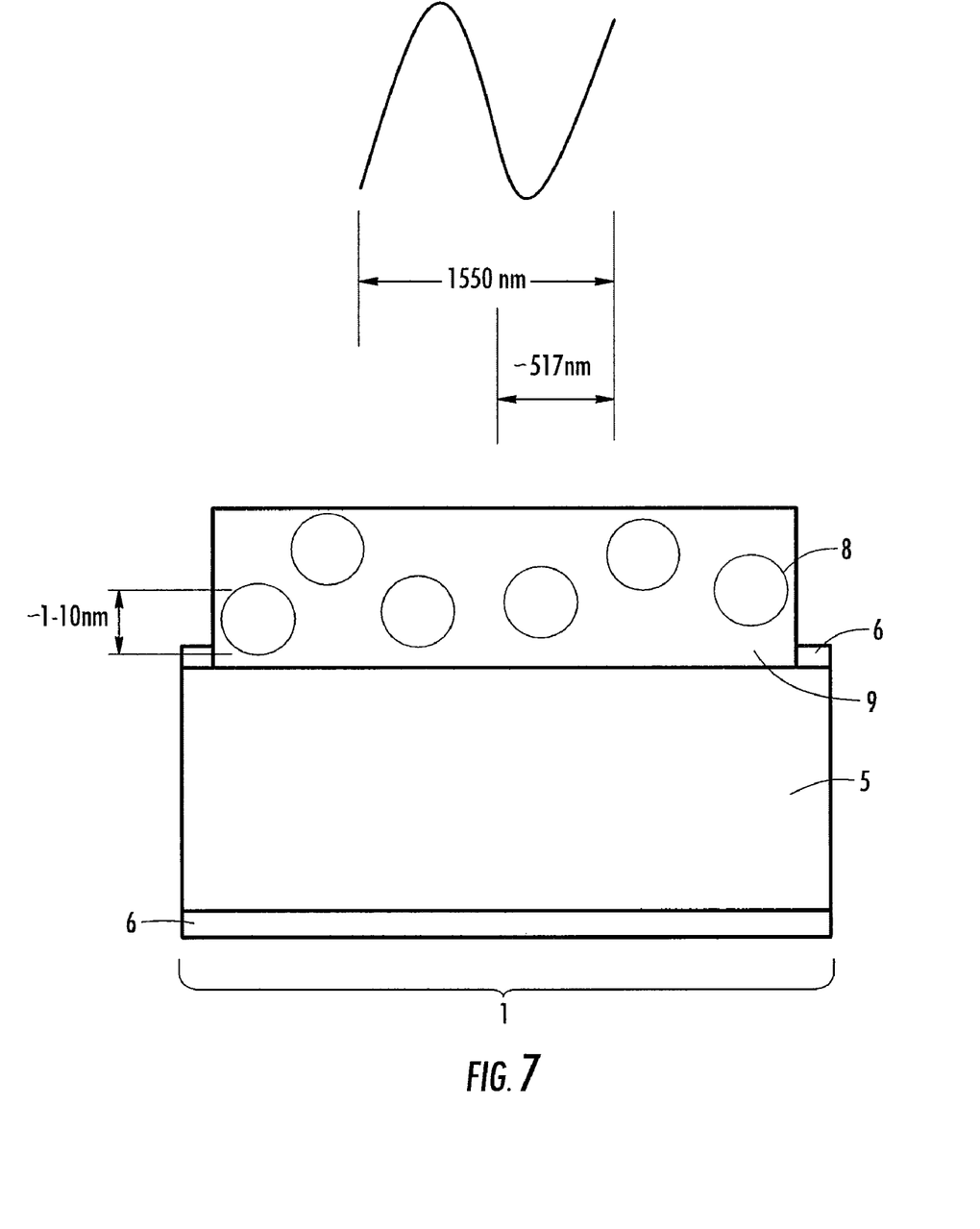
FIG. 7 is a diagram highlighting how quantum dots according to the present disclosure fall within the one third wavelength or less optimal distance for evanescent wave coupling.
Figure 8:
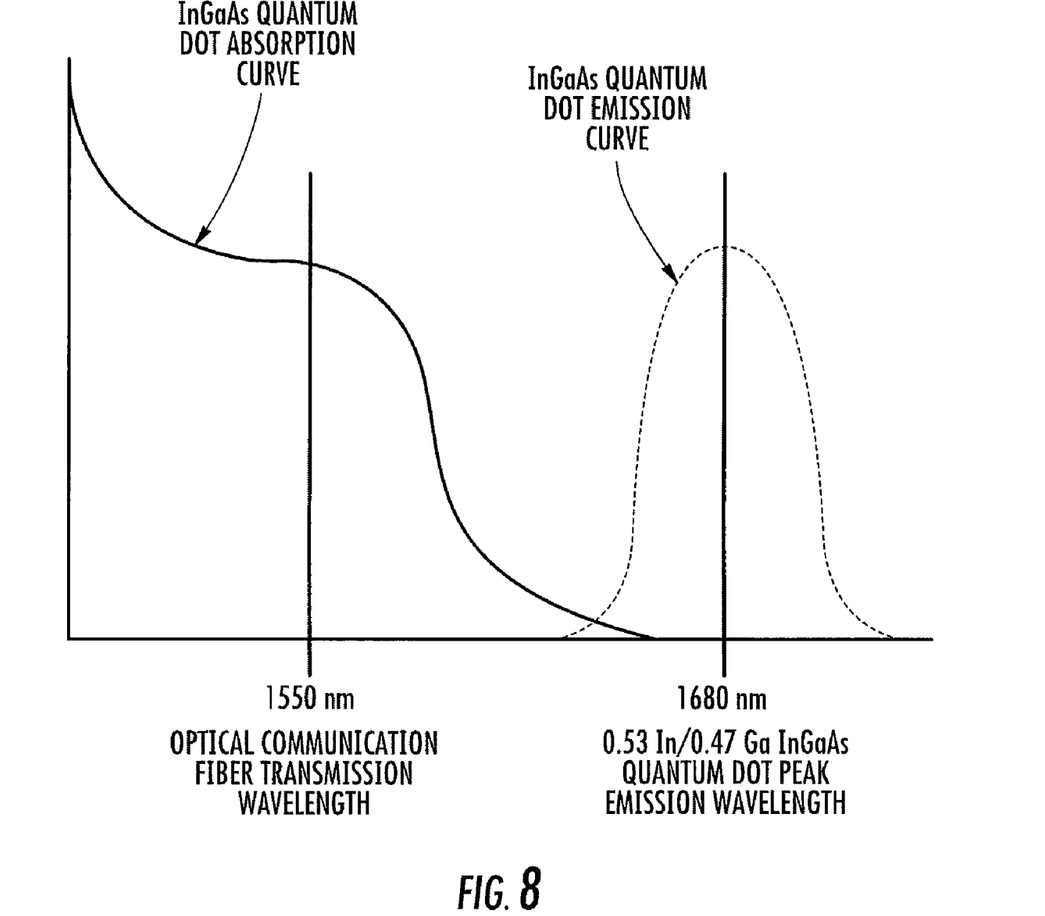
FIG. 8 is an illustration showing the absorption and emission spectra for a InGaAs quantum dot having a concentration of 0.53 In and 0.47 Ga and the typical transmission wavelength of optical fiber communication systems.

Again referring to FIG. 1, the fiber optic cable 1 comprises an uncladded portion 7, wherein within the uncladded portion 7 is a plurality of quantum dots 8 dispersed in a medium 9. According to a preferred embodiment of the present disclosure, the medium 9 does not penetrate within the fiber optic core 5, thereby allowing for the non-invasive diagnosis of the fiber optic cable 1 with minimal to no disruption of the signal. Instead, and as shown in FIG. 6, the evanescent waves 12 created by the internally reflected sinusoidal waves of the carrier light beam 2 are absorbed by the QDs 8 at the surface by evanescent wave coupling, i.e., the process by which electromagnetic waves are transmitted from one medium to another by means of the evanescent. These QDs in turn become excited 8a and emit light 13 at the wavelength of their bandgap. As shown in FIG. 7, since preferable QDs are typically between 1-10. nm in size, they fall well within the one third wave length or less optimal distance for evanescent wave coupling. For example, the distance for evanescent wave coupling is approximately 1550 nm, and one third of that wavelength is approximately 517 nm. Referring again to FIG. 6, the emitted light 13 can then be collected by a detecting device 14 that is in optical communication with the QDs 8 (and activated QDs 8a) of the fiber optic cable 1 and whose transmission window would be matched to the peak emission of the activated QDs 8a. For example, and as shown in FIG. 8, QDs comprising InGaAs emit light having a peak emission wavelength of approximately 1680 nm, therefore the detecting device 14 would have a transmission window matched to this peak emission wavelength, or 1680 nm. Finally, referring again to FIG. 6, the collected data would be analyzed by an analyzing apparatus 15 that is operably connected to the detecting device 14 to measure the desired parameters.

The medium may be of various thicknesses so long as the QDs dispersed within the medium can come in contact with the evanescent waves generated by the total internal reflection of the carrier light wave traveling within the fiber optic core. Suitable thicknesses for the medium include, but are not limited to, for example, from about 1 to 50 $\mu$m thick, from about 2 to 40 $\mu$m thick, from about 3 to 35 $\mu$m thick, from about 4 to 30 $\mu$m thick, and from about 6 to 26 $\mu$m thick.

As used herein, the term "detecting device" refers to any device capable of detecting light. Examples include, but are not limited to, the AP series, AT1 series, AT2 series, and AT2S series infrared detectors manufactured by CalSensors, Inc., and the like. Preferably, the device will be able to detect low light levels (i.e., low light sensitive). More preferably, the device will be a low light sensitive infrared detector. In certain embodiments, the optics of the detecting means comprises a band pass filter having a transmission window matched to the peak emission of the QD. In other embodiments, the optics of the detecting device comprises a notched filter having a transmission window matched to the peak emission of the QD.

As used herein, the term "analyzing apparatus" refers to any device capable of analyzing data collected by the detecting device that are well known to those skilled in the art, such as a spectral analyzer. Suitable analyzing apparatuses include, but are not limited to, the AQ6331 Optical Spectrum Analyzer (OSA) manufactured by Yokogawa Electronic Corp., the MS9780A OSA manufactured by Anritsu Co., the Q8344A, Q8347, Q8383, and Q8381A OSAs manufactured by Advantest, the 71450B, 71451B, and 71452B OSAs manufactured by Agilent, and the like. In certain embodiments, the analyzing apparatus further comprises a demodulating device that is capable of recovering the information carried in the light beam.

Figure 9:
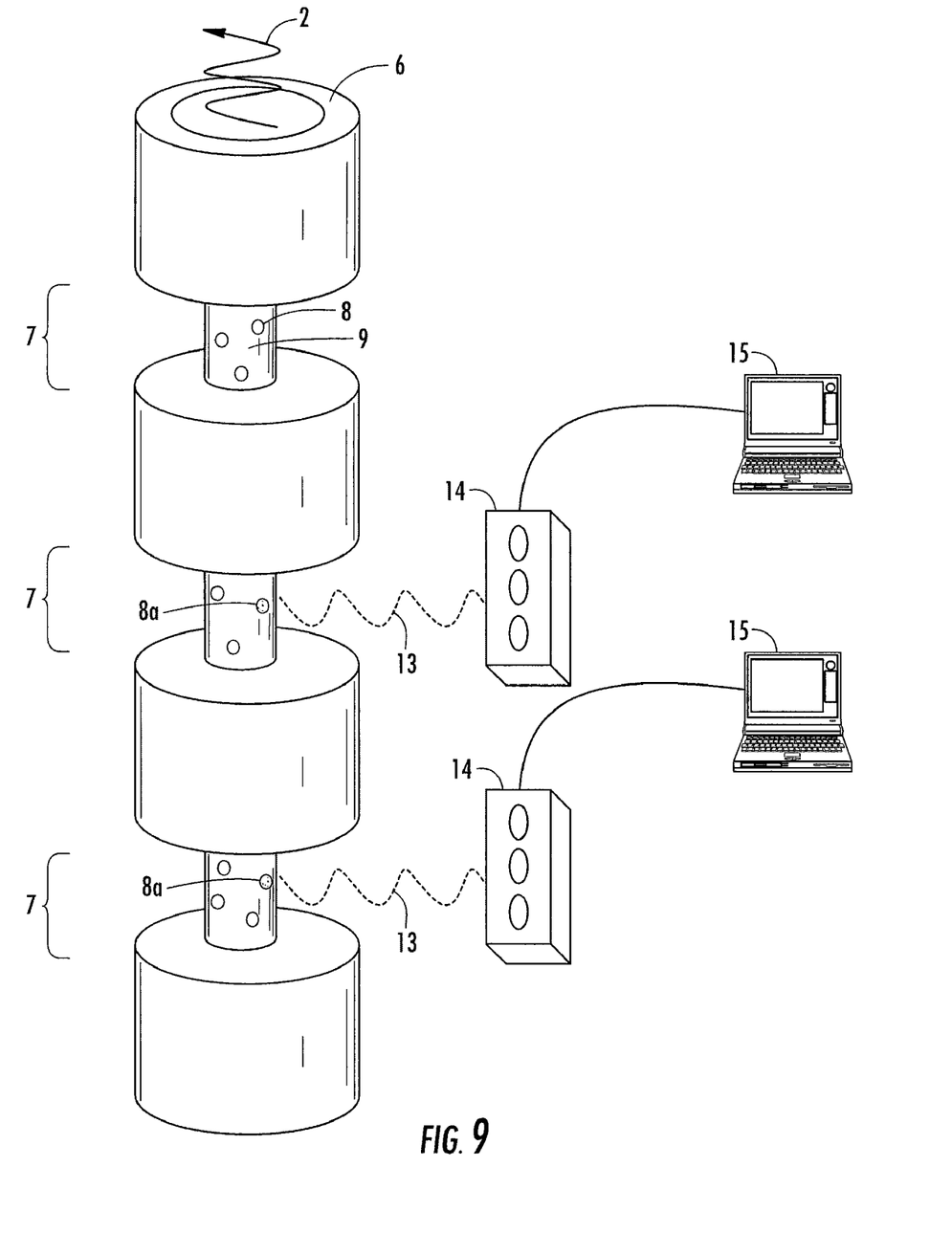
FIG. 9 represents a fiber optic communication fiber having a plurality of uncladded regions according to one embodiment of the present disclosure.

In another embodiment of the disclosure, and shown in FIG. 9, the fiber optic cable 1 may comprise a plurality of uncladded portions 7. The uncladded portions 7 may be placed anywhere along the fiber optic cable 1, and can be readily determined by one skilled in the art. In one embodiment, each uncladded portion 7 comprises QDs 8 and medium 9 having the same characteristics (e.g., similar bandgaps, similar index of refraction, etc.). In another embodiment, each uncladded portion 7 may comprise a different type of QD 8 and/or medium 9. For example, one uncladded portion 7 may comprise a plurality of indium arsenide QDs tuned to emit light having a wavelength of 2.78 $\mu$m while another uncladded portion 7 may comprise a plurality of indium gallium arsenide QDs tuned to emit light having a wavelength of 1.68 $\mu$m. In other embodiments, the uncladded portions 7 may comprise mediums 9 having different refractive indexes, thereby altering the speed that light can travel through the different mediums 9. The number of uncladded portions 7, the types of QDs 8 and the types of mediums 9 used will be dependent on the parameters to be measured and can be readily determined by one skilled in the art. The light emitted 13 from the excited QDs 8a can then be collected by one or more detecting device 14 and analyzed by one or more analyzing apparatuses 15 to measure the different parameters.

Figure 10:
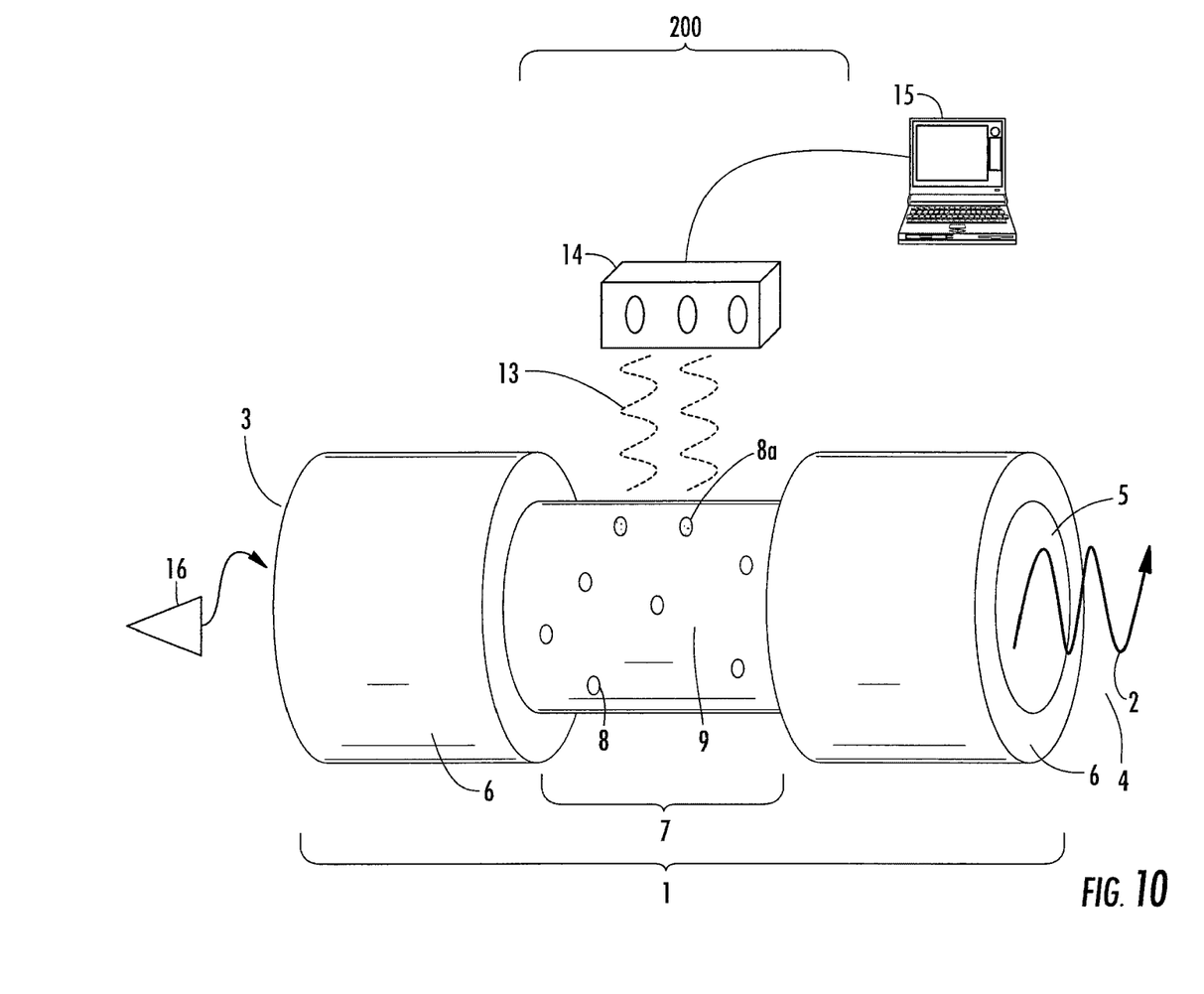
FIG. 10 represents an example of a system according to one embodiment of the present disclosure.

According to another aspect of the present disclosure and with reference to FIG. 10, there is also provided a system 200 for the non-invasive diagnosis of an optical fiber communication fiber 1 comprising at least one uncladded portion 7, wherein within the uncladded portion 7 is a plurality of QDs 8 dispersed in a medium 9, as previously described. The system includes a light generating means 16 for inputting a carrier light wave 2 into the first end 3 of the optical fiber 1. Upon activation of the QDs 8 by evanescent wave coupling generated by the total internal reflection of the carrier light wave 2 off of the walls of the fiber core 5a, the excited QDs 8a emit light 13 at the wavelength of the QDs bandgap. A detecting device 14 in optical communication with the uncladded portion 7 of the optical fiber 1 is also provided for detecting the light emitted 13 by the activated QDs 8a. Such a system further provides an analyzing apparatus 15 operatively connected to the detecting device 14 for analyzing the light emitted 13 from the activated QDs 8a.

Thus, in order to diagnose the system according to the present disclosure, QDs dispersed in the medium within the uncladded portion are excited by evanescent wave coupling generated by the total internal reflection of a carrier light beam traveling within the fiber optic core. The excited QDs then emit light at a wavelength according to the QDs bandgap. The emitted light is then collected by a detecting device that is operatively connected to the uncladded portion of the fiber optic cable. The collected light is then sent to an analyzing apparatus that is operatively connected to the detecting device, where it is then analyzed to determine the parameter values to be measured. Suitable parameters to be measured include any parameters that will provide information relating to the health and integrity of the optical fiber, such as disruptions of the carrier light beam due to breaks or fractures in the optical fiber, temperature, and the like. In certain embodiments, the means for detecting light comprises a transmission window that is matched to the peak emission of the QDs.

In yet another aspect, the present disclosure provides a method of non-invasively diagnosing an optical communications fiber comprising providing an optical fiber for conveying a light beam, where the optical fiber comprises a first end for receiving the light beam and a second end opposed thereto, a core having an interior wall and a cladding surround the core, the optical fiber further having at least one uncladded portion, wherein the uncladded portion comprises a plurality of quantum dots dispersed in a medium; providing a means for generating light, where the generated light is injected into the first end of the fiber optic cable; providing a means for detecting light in optical communication with the QDs; and providing a means for analyzing the detected light that is operably connected to the detector, wherein the QDs become activated by evanescent wave coupling generated by the total internal reflection of the light beam off of the interior wall of the fiber core, the QDs emit light at the wavelength of the QDs bandgap. The detecting device detects the light emitted by the activated QDs and transmits the collected information to an analyzing apparatus to measure the different parameters.

It is understood that the foregoing detailed description are illustrative only and are not to be taken as limitations upon the scope of the disclosure. Various changes and modifications to the disclosed embodiments, which will be apparent to those skilled in the art, may be made without departing from the spirit and scope of the present disclosure. Further, all patents, patent applications and publications cited herein are incorporated herein by reference.

What is claimed is:

1. An optical fiber capable of being diagnosed non-invasively comprising an optical fiber for conveying a light beam;
    said optical fiber comprising a first end for receiving said light beam and a second end opposed thereto, a core comprising an inner wall, and a cladding surrounding said core,
    said optical fiber further comprising at least one uncladded portion comprising a plurality of quantum dots dispersed in a medium;
    wherein said quantum dots become activated by evanescent wave coupling resulting from total internal reflection of said light beam contacting said inner wall of said optical fiber core and wherein said activation results in emittance of light from said quantum dots external to the uncladded portion.

2. The optical fiber according to claim 1, wherein said plurality of quantum dots comprise a bandgap that is below a bandgap of said light beam.

3. The optical fiber according to claim 1, wherein said medium comprises a transparent or translucent material.

4. The optical fiber according to claim 3, wherein said medium is selected from the group consisting of Sol Gel glass, polymethylmethacrylate, polyacrylamide, polystyrene, polyimide, polyethylene, polyvinyl, poly-diacetylene, polyphenylene-vinylene, polypeptide, polysaccharide, polysulfone, polypyrrole, polyimidazole, polythiophene, polyether, epoxies, silica glass, silica gel, fluorozirconate glass, fluoroaluminate glass, chalcogenide glass, siloxane, polyphosphate, hydrogel, agarose, and cellulose.

5. The optical fiber according to claim 4, wherein said medium comprises Sol Gel glass or polymethylmethacrylate.

6. The optical fiber according to claim 1, wherein said medium and plurality of quantum dots do not penetrate said fiber optic core.

7. The optical fiber according to claim 1, wherein said quantum dots are tuned to emit infrared light.

8. The optical fiber according to claim 7, wherein said plurality of quantum dots are tuned to emit light having a wavelength of about 0.75 µm to about 750 µm upon activation.

9. The optical fiber according to claim 8, wherein said plurality of quantum dots are tuned to emit light having a wavelength of about 1.0 µm to about 250 µm.

10. The optical fiber according to claim 1, wherein said plurality of quantum dots is selected from the group consisting of InAs, InGaAs, PbS, CdTe, MgTe, PbSe, CdTeS, InSb, InAsSb, GaSb and combinations thereof.

11. The optical fiber according to claim 10, wherein said plurality of quantum dots is InGaAs.

12. The optical fiber according to claim 1, further comprising a detector device to detect light emitted from said quantum dots, wherein said detector device comprises a transmission window that is matched to the peak emission of said quantum dots.

13. The optical fiber according to claim 12, wherein said detector device comprises a low level light sensor.

14. The optical fiber according to claim 13, wherein said detector device detects infrared light.

15. The optical fiber according to claim 14, further comprising an analyzing apparatus operably connected to said detecting means.

16. A system for the non-invasive and real-time diagnosis of an optical fiber comprising:
    an optical fiber for conveying a light beam, said optical fiber comprising a first end for receiving said light beam and a second end opposed thereto, a core comprising an inner wall, and a cladding surrounding said core, said optical fiber further having at least one uncladded portion, wherein said uncladded portion comprises a plurality of quantum dots dispersed in a medium;
    a light source to inject a light beam into said first end of said optical fiber;
    a detecting device configured for detecting light emitted external to the uncladded portion, when said emitted light is from said plurality of quantum dots; and
    an analyzing apparatus for analyzing said detected light operably connected to said detector.

17. The system according to claim 16, wherein said detector device comprises a low level light sensor.

18. The system according to claim 16, wherein said analyzing apparatus further comprises a demodulating device.

19. A method of non-invasively diagnosing an optical fiber comprising:
    placing a medium comprising a plurality of quantum dots dispersed therein on an uncladded portion of said optical fiber;
    injecting a light beam into one end of said optical fiber; and
    detecting any light emitted from said quantum dot external to the uncladded portion that has become activated by evanescent wave coupling resulting from the internal reflection of said light beam contacting an inner wall of said optical fiber core.

20. The method according to claim 19, further comprising matching a transmission window of a detector device to a peak emission of said quantum dots.

21. The method according to claim 19, wherein detecting any light comprises detecting infrared light.

22. The method according to claim 19, further comprising analyzing any detected light to non-invasively diagnose said optical fiber.

23. The method according to claim 19, wherein said plurality of quantum dots comprises a bandgap that is below a bandgap of said light beam.

24. The method according to claim 19, wherein said quantum dots are selected from the group consisting of InAs, InGaAs, PbS, CdTe, MgTe, PbSe, CdTeS, InSb, InAsSb, GaSb and combinations thereof.

25. The method according to claim 24, wherein said plurality of quantum dots is InGaAs.

26. The method according to claim 19, wherein said quantum dots are tuned to emit infrared light.

27. The method according to claim 19, wherein said medium is transparent or translucent.

28. The method according to claim 27, wherein said medium is selected from the group consisting of Sol Gel glass, polymethylmethacrylate, polyacrylamide, polystyrene, polyimide, polyethylene, polyvinyl, poly-diacetylene, polyphenylene-vinylene, polypeptide, polysaccharide, polysulfone, polypyrrole, polyimidazole, polythiophene, polyether, epoxies, silica glass, silica gel, fluorozirconate glass, fluoroaluminate glass, chalcogenide glass, siloxane, polyphosphate, hydrogel, agarose, and cellulose.

29. The method according to claim 28, wherein said medium is polymethylmethacrylate or Sol Gel glass.

30. The method according to claim 19, further comprising forming said medium on said uncladded portion, wherein said medium does not penetrate said fiber optic core.

* * * * *